United States Patent
Lee et al.

(10) Patent No.: US 12,445,522 B2
(45) Date of Patent: Oct. 14, 2025

(54) ELECTRONIC DEVICE FOR PERFORMING WI-FI DIRECT GROUP COMMUNICATION, AND METHOD THEREFOR

(71) Applicant: SAMSUNG ELECTRONICS CO., LTD., Suwon-si (KR)

(72) Inventors: Soonho Lee, Suwon-si (KR); Buseop Jung, Suwon-si (KR); Beomjip Kim, Suwon-si (KR); Hakkwan Kim, Suwon-si (KR); Hyejung Bang, Suwon-si (KR); Dooho Lee, Suwon-si (KR); Sunkee Lee, Suwon-si (KR); Wonjun Jang, Suwon-si (KR); Namju Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/229,458

(22) Filed: Aug. 2, 2023

(65) Prior Publication Data
US 2024/0015209 A1    Jan. 11, 2024

Related U.S. Application Data

(63) Continuation of application No. PCT/KR2022/001056, filed on Jan. 20, 2022.

(30) Foreign Application Priority Data

Feb. 2, 2021 (KR) ............. 10-2021-0014771

(51) Int. Cl.
*H04L 67/104* (2022.01)
*H04L 67/54* (2022.01)

(52) U.S. Cl.
CPC ............ *H04L 67/104* (2013.01); *H04L 67/54* (2022.05)

(58) Field of Classification Search
CPC .............................. H04L 67/104; H04L 67/54
See application file for complete search history.

(56) References Cited

U.S. PATENT DOCUMENTS

| 9,049,658 B2 | 6/2015 | Ponmudi et al. |
| 9,148,854 B2 | 9/2015 | Garg et al. |

(Continued)

FOREIGN PATENT DOCUMENTS

| KR | 10-1836385 B1 | 3/2018 |
| KR | 10-2020-0041662 A | 4/2020 |

(Continued)

OTHER PUBLICATIONS

Praneeth, K., "P2P Power Saving Mechanism—Part 2—Notice of Absence (NoA)", Dec. 7, 2019, Praneeth's Blog, 13 pages. https://praneethwifi.in/2019/12/07/p2p-powersaving-mechanism-part-2-notice-of-absence-noa/.

(Continued)

*Primary Examiner* — Blake J Rubin
(74) *Attorney, Agent, or Firm* — Sughrue Mion, PLLC

(57) ABSTRACT

An electronic device includes: a communication module; a memory; and at least one processor operatively connected to the communication module and the memory, wherein the at least one processor is configured to: control the communication module to generate a direct communication group in which an external electronic device operates as a group owner and the electronic device operates as a group client through a Wi-Fi direct connection with the external electronic device, to perform wireless communication; control the communication module to transmit, to the external electronic device, a schedule change request message requesting to change an operation schedule of the direct communication group, based on a change in an operating state, related to wireless communication through the direct communication group, of at least one of the at least one (Continued)

processor and the communication module; receive, through the communication module from the external electronic device, a response message including operation schedule information configured based on the schedule change request message; and control the communication module to perform wireless communication according to the operation schedule information of the response message received from the external electronic device.

15 Claims, 17 Drawing Sheets

(56) References Cited

U.S. PATENT DOCUMENTS

| | | | |
|---|---|---|---|
| 9,585,144 B1* | 2/2017 | Shaw | H04W 76/15 |
| 9,699,500 B2 | 7/2017 | Kafle et al. | |
| 10,433,346 B1 | 10/2019 | Kencharla | |
| 2013/0028156 A1* | 1/2013 | Vedantham | H04W 52/0235 370/311 |
| 2013/0124894 A1 | 5/2013 | Cho | |
| 2014/0071870 A1* | 3/2014 | Abraham | H04W 52/0206 370/311 |
| 2014/0301294 A1 | 10/2014 | Kwon et al. | |
| 2014/0372775 A1 | 12/2014 | Li et al. | |
| 2015/0024687 A1* | 1/2015 | Rawat | H04W 4/80 455/41.2 |
| 2015/0036733 A1* | 2/2015 | Smadi | H04N 19/172 375/240.01 |
| 2015/0036735 A1 | 2/2015 | Smadi et al. | |
| 2015/0103680 A1* | 4/2015 | Anand | H04W 72/569 370/336 |
| 2015/0365986 A1 | 12/2015 | Lee et al. | |
| 2016/0135017 A1* | 5/2016 | Wu | H04W 56/001 370/350 |
| 2016/0212606 A1* | 7/2016 | Qi | H04W 8/005 |
| 2016/0262169 A1* | 9/2016 | Das | H04W 74/04 |
| 2016/0295350 A1* | 10/2016 | Alanen | H04W 74/002 |
| 2016/0316488 A1* | 10/2016 | Ko | H04W 52/0216 |
| 2018/0098208 A1* | 4/2018 | Chaki | H04W 72/121 |
| 2018/0206110 A1* | 7/2018 | Chaki | H04L 45/122 |
| 2018/0336499 A1* | 11/2018 | Kneckt | G06Q 10/06 |
| 2020/0120453 A1 | 4/2020 | Kim et al. | |
| 2020/0358544 A1* | 11/2020 | Huang | H04W 72/044 |
| 2021/0282119 A1* | 9/2021 | Asterjadhi | H04W 76/15 |
| 2022/0078844 A1* | 3/2022 | Cherian | H04W 74/0808 |
| 2022/0086763 A1 | 3/2022 | Jung | |

FOREIGN PATENT DOCUMENTS

| | | |
|---|---|---|
| KR | 10-2020-0069532 A | 6/2020 |
| KR | 10-2126994 B1 | 6/2020 |
| KR | 10-2020-0120587 A | 10/2020 |

OTHER PUBLICATIONS

Baron, S., et al., 'Direct Link MU transmissions', doc.: IEEE 802.11-19/1117r2, Sep. 19, 2019, 13 pages.

Das, D, et al., "Triggered P2P", doc .: IEEE 802.11-19/1604r1, Jan. 13, 2020, 16 pages.

Written Opinion (PCT/ISA/237) issued Apr. 27, 2022 by the International Searching Authority in International Application No. PCT/KR2022/001056.

International Search Report (PCT/ISA/210) issued Apr. 27, 2022 by the International Searching Authority in International Application No. PCT/KR2022/001056.

Extended European Search Report dated Jun. 6, 2024, issued by the European Patent Office in European Application No. 22749895.3.

"Wi-Fi Peer-to-Peer (P2P) Technical Specification version 1.5", WiFi Alliance, Aug. 4, 2014, XP055234860, pp. 1-183 (183 p. total).

Jung et al., "Designing content-centric multi-hop networking over Wi-Fi Direct on smartphones", 2014 IEEE Wireless Communications and Networking Conference (WCNC), IEEE, Apr. 6, 2014, XP032682680, pp. 2934-2939 (6 pages total).

* cited by examiner

FIG. 10

- IEEE 802.11 Wireless Managment
  - Fixed parameters
    - Caregory code: Vendor Specific (127)
    - OUI: 50 : 6f : 9a (Wi-Fi Alliance)
    - WFA Subtype: P2P (9)
    - P2P Action Subtype: P2P Presence Request (1) ~1001
    - P2P Action Dialog Token: 1
  - Tagged parameters ( 37 bytes )
    - Tag: Vendor Specific: Wi-Fi Alliance: P2P
      - Tag Number: Vendor Specific (221)
      - Tag length: 35
      - OUI: 50 : 6f : 9a (Wi-Fi Alliance)
      - Vendor Specific OUI Type: 9
      - Notice of Absence ~1003
        - Attribute Type: Notice of Absence (12)
        - Attribute Length: 28
        - Index: 0
        - CTWindow and OppPS Parameters (12)
        - 0... .... = OppPS: 0
        - .000 0000 = CTWindow: 0
        - Count / Type: 1
        - Duration: 1
        - Interval: 2
        - Start Time: 0
        - Count / Type: 2
        - Duration: 1
        - Interval: 2
        - Start Time: 0

FIG. 11

- IEEE 802.11 Wireless Managment
  - Fixed parameters
    - Caregory code: Vendor Specific (127)
    - OUI: 50 : 6f : 9a (Wi-Fi Alliance)
    - WFA Subtype: P2P (9)
    - P2P Action Subtype: P2P Presence Request (2) ~1101
    - P2P Action Dialog Token: 1
  - Tagged parameters ( 15 bytes )
    - Tag: Vendor Specific: Wi-Fi Alliance: P2P
      - Tag Number: Vendor Specific (221)
      - Tag length: 13
      - OUI: 50 : 6f : 9a (Wi-Fi Alliance)
      - Vendor Specific OUI Type: 9
      - Status: 0 (Success)
        - Attribute Type: Status (0)
        - Attribute Length: 1
        - Status Code: Success (0) ~1103
      - Notice of Absence
        - Attribute Type: Notice of Absence (12)
        - Attribute Length: 2
        - Index: 0
        - CTWindow and OppPS Parameters: 0x00
        - 0... .... = OppPS: 0
        - .000 0000 = CTWindow: 0

FIG. 12A

| Field Name | Size (octets) | Value | Description |
|---|---|---|---|
| 1201 attribute ID | 1 | 12 | Identifying the type of P2P attribute. The specific value is defined in Table 6. |
| 1202 length | 2 | n * (13) + 2 | Length of the P2P Notice of Absence attfibute body in octets |
| 1203 index | 1 | - | Identifies an instance of Notice of Absence timing. |
| CTWindow and OppPS Parameters | 1 | - | Parameters indicating P2P Group Owner's availability window and opportunistic power save capability |
| Notice of Absence Descriptor(s) | n * 13 | - | Zero or more Notice of Absence Descriptors each defining a Notice of Absence timing schedule |

FIG. 12B

| Field Name | Size (octets) | Value | Description |
|---|---|---|---|
| count / type | 1 | 1 - 255 | Count in Notice of Absence Descriptors sent by a P2P Group Owner, indicates number of absence intervals. 255 shall mean a continuous schedule; 0 is reserved and shall not be used.<br>Type in Notice of Absence Descriptors sent by a P2P Client in a P2P Presence Request; qualified the Duration and Interval fields. A Type value of 1 shall indicate preferred values, a Type value of 2 shall indicate acceptable limits. |
| duration | 4 | - | In Notice of Absence Descriptors sent by a P2P Group Owner, indicates the maximum duration in units of microseconds that the P2P Group Owner can ramain absent following the start of a Notice of Absence interval.<br>In Notice of Absence Descriptors a P2P Client in a P2P Presence Request; indicates a preferred, or minimum acceptable presence period duration. |
| interval | 4 | - | In Notice of Absence Descriptors sent by a P2P Group Owner, indicates the length of the Notice of Absence interval in units of microseconds.<br>In Notice of Absence Descriptors sent by a P2P Client in a P2P Presence Request; indicates a preferred of minimum interval between presence periods. |
| * start time | 4 | - | The start time for the schedule expressed tems of the lower 4 bytes of the TSF time.<br>The Start Time field is reserved and shall be set to 0 on transmission and ignored on reception in Notice of Absence attributes transmitted by a P2P Client. |

| NoA | P2P Group Owner Average Power Consumption | Compared to Default |
|---|---|---|
| 0% (Default) | 75.04 mA | - |
| 20% | 66.24 mA | -11.7% |
| 40% | 53.09 mA | -29.3% |
| 60% | 37.01 mA | -50.7% |
| 80% | 26.72 mA | -64.4% |
| 99% | 13.84 mA | -81.6% |

ELECTRONIC DEVICE FOR PERFORMING WI-FI DIRECT GROUP COMMUNICATION, AND METHOD THEREFOR

CROSS-REFERENCE TO RELATED APPLICATIONS

This application is a bypass continuation application of International Patent Application No. PCT/KR2022/001056, filed on Jan. 20, 2022, which is based on and claims priority to Korean Patent Application No. 10-2021-0014771, filed on Feb. 2, 2021 with the Korean Intellectual Property Office, the disclosures of each of which are incorporated by reference herein in their entireties.

BACKGROUND

1. Field

The disclosure relates to an electronic device that establishes a direct communication group with another device and performs wireless communication through Wi-Fi direct technology.

2. Description of Related Art

Wi-Fi direct (or Wi-Fi P2P, hereinafter referred to as WFD) technology is a technology that provides a direct connection between a plurality of electronic devices by utilizing the existing Wi-Fi interface, and may provide a direct connection between electronic devices without an access point (AP), which is a medium of an infrastructure network.

An electronic device may wirelessly connect to another electronic device through WFD technology and use functions of other electronic devices, including various service providing functions such as a data transmission service, a multimedia playback service, a document printing service, a display service, a wireless docking service, or a wireless serial bus (WSB) service.

A plurality of electronic devices may form a wireless communication group for using the WFD service, and one of the plurality of electronic devices forming the group may operate as the group owner (GO) while the others may operate as group clients (GC).

An external electronic device operating as the group owner of the wireless communication group may perform a function such as an access point of a wireless LAN network, and an electronic device operating as a group client may perform a function such as a station of a wireless LAN network. The generation of a group using WFD technology is possible not only with 1:1 connection, but also with 1:N connection, and the number of acceptable group clients may be determined according to the performance of an external electronic device designated as the owner of the group.

An electronic device that is a group client in a direct communication group may not transmit data to an external electronic device that is the group owner according to a change in the operating state of the group client while communicating with the external electronic device that the group owner. For example, during communication with the external electronic device that is the group owner, the electronic device that is a group client may temporarily stop a service provided through the direct communication group or perform other wireless communication through another communication channel that cannot coexist with the communication channel of the direct communication group.

Even though data is not transmitted from the electronic device that is a group client to the external electronic device that is the group owner through a communication channel of the direct communication group according to a change in the operating state of the electronic device that is a group client, as the external electronic device that is the group owner maintains a communication channel with an electronic device that is a group client and maintains a standby state to provide services, power consumption may occur.

SUMMARY

Provided are a method of changing an operation schedule of the external electronic device that is the group owner, based on a change in the operating state of the electronic device that is a group client in a Wi-Fi direct communication group, and the electronic device thereof.

According to an aspect of the disclosure, an electronic device includes: a communication module; a memory; and at least one processor operatively connected to the communication module and the memory, wherein the at least one processor is configured to: control the communication module to generate a direct communication group in which an external electronic device operates as a group owner and the electronic device operates as a group client through a Wi-Fi direct connection with the external electronic device, to perform wireless communication; control the communication module to transmit, to the external electronic device, a schedule change request message requesting to change an operation schedule of the direct communication group, based on a change in an operating state, related to wireless communication through the direct communication group, of at least one of the at least one processor and the communication module; receive, through the communication module from the external electronic device, a response message including operation schedule information configured based on the schedule change request message; and control the communication module to perform wireless communication according to the operation schedule information of the response message received from the external electronic device.

The schedule change request message may include at least one of information describing a current operating state, information describing a change time, or information describing a change interval.

The at least one processor may be further configured to control the communication module to transmit the schedule change request message in a peer-to-peer (P2P) presence request frame, and the P2P presence request frame may include at least one of an attribute field, a duration field, or an interval field.

The at least one processor may be further configured to receive, through the communication module, the response message in a P2P presence response frame, and the P2P presence response frame may include a status code indicating a result of the schedule change request message.

The at least one processor may be further configured to receive, through the communication module, the response message transmitted in a predefined beacon frame.

The at least one processor may be further configured to: control the communication module to connect to the external electronic device through a second communication channel different from a first communication channel for wireless communication through the direct communication group; and control the communication module to transmit the schedule change request message through the second communication channel.

The at least one processor may be further configured to identify the change in the operating state of at least one of the at least one processor or the communication module according to a change in an operating state of an application providing a service through the direct communication group.

The at least one processor may be further configured to, based on identifying that the wireless communication is performed by being connected to an access point through periodic channel change based on time division, generate the schedule change request message by including information on the periodic channel change.

According to an aspect of the disclosure, a method of an electronic device includes: generating a direct communication group in which an external electronic device operates as a group owner and the electronic device operates as a group client through a Wi-Fi direct connection with the external electronic device, to perform wireless communication; transmitting, to the external electronic device, a schedule change request message requesting to change an operation schedule of the direct communication group, based on a change in the operating state, related to wireless communication through the direct communication group, of the electronic device; receiving, from the external electronic device, a response message including operation schedule information configured based on the schedule change request message; and performing wireless communication with the external electronic device according to the operation schedule information of the response message received from the external electronic device.

The schedule change request message may include at least one of information describing a current operating state, information describing a change time, or information describing a change interval.

The schedule change request message is transmitted in a peer-to-peer (P2P) presence request frame, and the P2P presence request frame may include at least one of an attribute field, a duration field, or an interval field.

The response message may be received in a predefined P2P presence response frame, and the P2P presence response frame may include a status code indicating a result of the schedule change request message.

The response message may be received in a predefined beacon frame.

The method may further include connecting to the external electronic device through a second communication channel different from a first communication channel for wireless communication through the direct communication group, and the transmitting the schedule change request message may include transmitting the schedule change request message through the second communication channel.

The method may further include identifying the change in the operating state of the electronic device according to a change in an operating state of an application providing a service through the direct communication group.

The method may further include identifying that the wireless communication is performed by being connected to an access point through periodic channel change based on time division; and generating the schedule change request message by including information on the periodic channel change.

According to an aspect of the disclosure, an electronic device includes: a communication module; a memory; and at least one processor operatively connected to the communication module and the memory, wherein the at least one processor is configured to: operate as a group owner of a Wi-Fi direct communication group; receive, through the communication module from a client electronic device operating as a group client of a direct communication group and connected through a Wi-Fi direct connection, a schedule change request message requesting to change an operation schedule of the direct communication group, the schedule change request message being transmitted based on a change in an operating state, related to wireless communication through the direct communication group, of the client electronic device; configure operation schedule information based on the schedule change request message; control the communication module to transmit, to the client electronic device, a response message including the operation schedule information; and enter an inactive state for at least one period determined according to the operation schedule information.

According to one or more embodiments, an operation schedule of an external electronic device that is the group owner of a direct communication group may be changed, based on a change in an operating state of an electronic device that is a group client in a direct communication group.

According to one or more embodiments, by enabling the external electronic device that is the group owner to change the operation schedule of a direct communication group, based on a change in the operating state of the electronic device that is a group client in a direct communication group, standby power consumption of the external electronic device that is the group owner may be reduced.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a diagram illustrating an example of a structure of the operation schedule change request message of FIG. 9 according to one or more embodiments;

FIG. 11 is a diagram illustrating an example of a structure of the operation schedule change request message of FIG. 9 according to one or more embodiments;

FIGS. 12A and 12B are diagrams illustrating an example of a structure of a message including operation schedule information of an external electronic device that is the group owner according to one or more embodiments;

FIG. 15 is a diagram illustrating an effect of reducing power consumption of an external electronic device that is the group owner according to a change in an operation schedule of a direct communication group by an electronic device that is a group client according to various embodiments.

DETAILED DESCRIPTION

Figure 1:
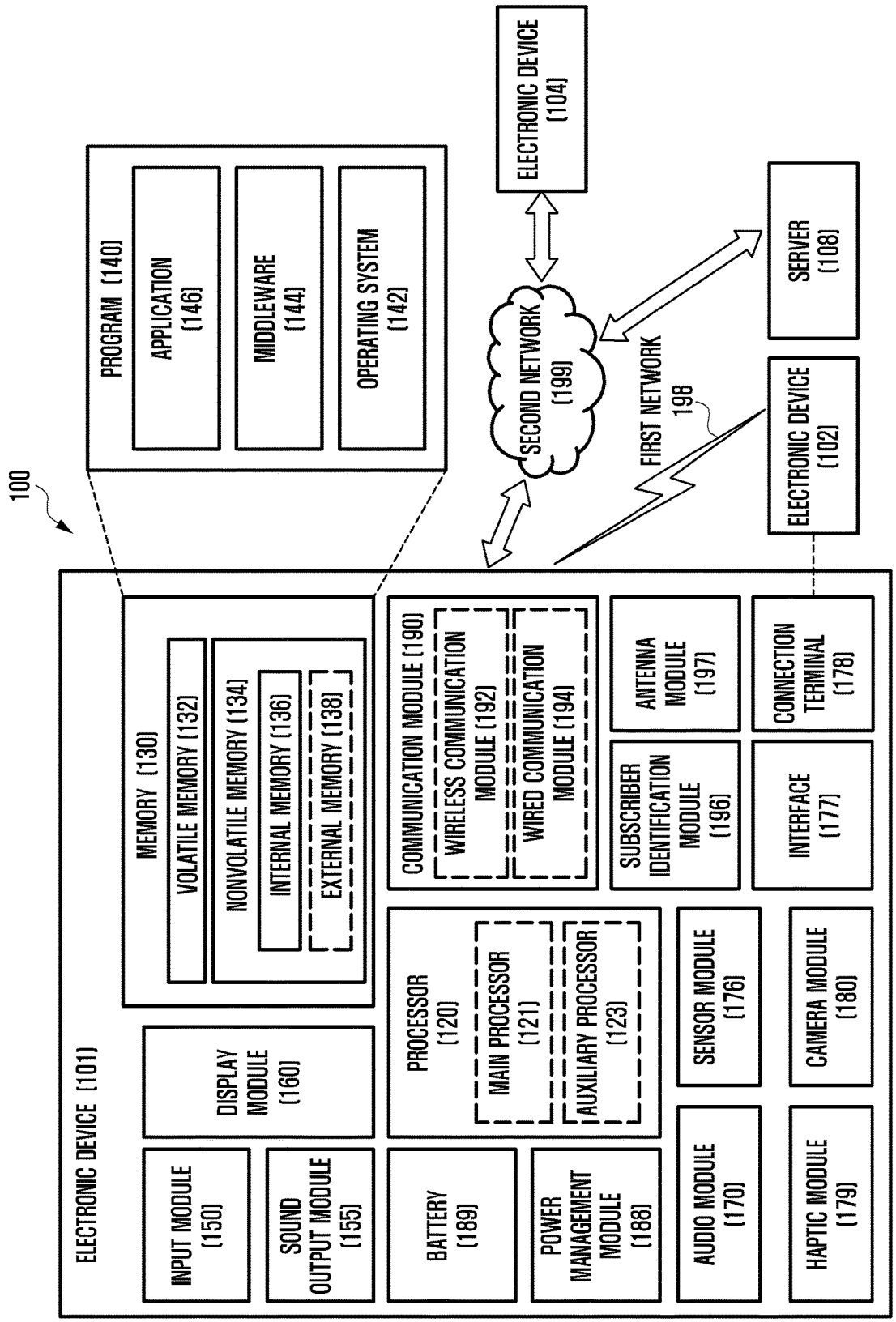
FIG. 1 is a block diagram of an electronic device in a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
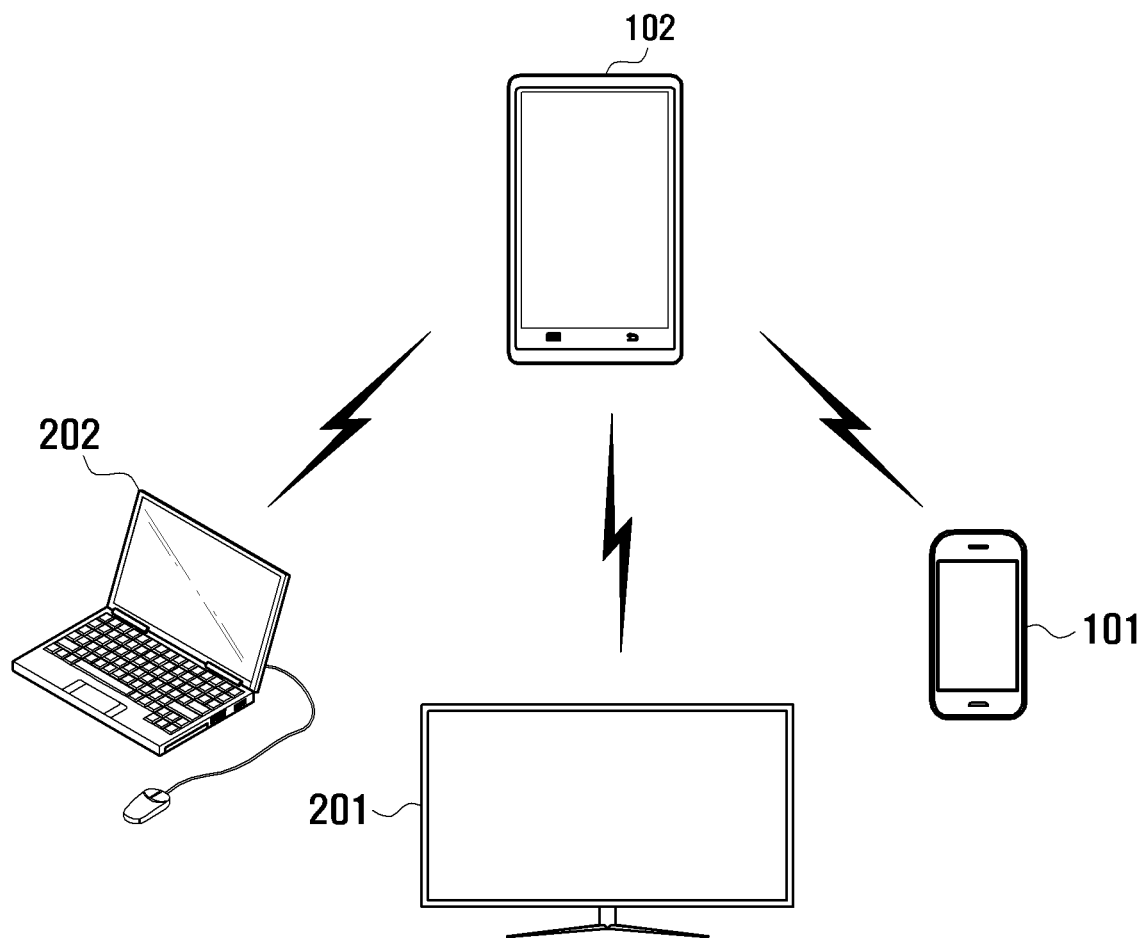
FIG. 2 is a diagram illustrating a network structure of a direct communication group according to one or more embodiments.

FIG. 2 is a diagram illustrating a network structure of a direct communication group according to one or more embodiments.

Referring to FIG. 2, the direct communication group may include a plurality of electronic devices (e.g., the electronic device 101 of FIG. 1, the external electronic device 102 of FIG. 1), an electronic device 201, and/or an electronic device 202. The plurality of electronic devices (101, 102, 201 and/or 202) may form a direct communication group according to the WFD-related protocol defined in the IEEE 802.11 Alliance Technical Standard (e.g., IEEE 802.11g and/or IEEE 802.11n), but is not limited thereto, and various embodiments of the disclosure may also be applied to various standard or non-standard technologies related to wireless local area network connection.

According to an embodiment, any one electronic device among a plurality of electronic devices (101, 102, 201 and/or 202) may operate as the group owner. For convenience, electronic device 102 will be assumed to be operating as the group owner hereinafter, and "external electronic device" and "group owner" may be used interchangeably herein. The group owner 102 may establish a connection with a group client electronic device 101 to form a direct group.

According to an embodiment, when the electronic device (201 or 202) is connected to the client electronic device 101 included in the direct communication group through the group owner 102, the electronic device 201 or 202 may newly become a client electronic device of the direct communication group, and the direct communication group may be newly formed by adding the electronic device (201 or 202) as a group client.

According to one embodiment, the group owner 102 may perform the same or substantively similar operation as the access point (AP) that constitutes a WLAN network. The group owner 102 may be determined through a group owner negotiation operation protocol when connecting 1:1 with the client electronic devices (101, 201, and/or 202) in the process of forming a direct communication group.

According to one embodiment, the group owner 102 may control the connection between the client electronic devices (101, 201, and/or 202), and may be connected to each of the client electronic devices (101, 201, and/or 202) in 1:1 or 1:N.

According to an embodiment, each electronic device (101, 102, 201 and/or 202) may be the same or substantively similar as the electronic device 101 illustrated in FIG. 1, or may be a different type of electronic device. For example, an electronic device (101, 102, 201 and/or 202) may be a terminal operating in a Wi-Fi peer-to-peer (P2P) network, and may include various additional electronic devices and/or components such as Bluetooth speakers, televisions, printers, or cameras that support WFD to provide services for performing data communication in addition to general external electronic devices such as smartphones, portable terminals, mobile terminals, personal digital assistants (PDAs), portable multimedia player (PMP) terminals, notebook computers or personal computers.

According to one or more embodiments, an electronic device (e.g., the electronic device 101) may include a communication module (e.g., the communication module 190), a memory (e.g., the memory 130), and at least one processor (e.g., the processor 120) operatively connected to the memory 130.

According to an embodiment, the processor 120 may be configured to control the communication module 190 to generate a direct communication group in which an external electronic device 102 operates as a group owner and the electronic device 101 operates as a group client through a Wi-Fi direct connection with the external electronic device (e.g., the electronic device 102), to thereby perform wireless communication, transmit, to the external electronic device 102, a schedule change request message requesting to change an operation schedule of the direct communication group, responsive to a change in an operating state, related to wireless communication through the direct communication group, of at least one of the processor 120 and the communication module 190, receive, from the external electronic device 102, a response message including operation schedule information configured based on the schedule change request message, and control the communication module 190 to perform wireless communication according to the operation schedule information of the response message received from the external electronic device.

According to an embodiment, the processor 120 may be configured to transmit information on operating state change of at least one of the processor 120 and the communication module 190 related to wireless communication through the direct communication group to the external electronic device 102 that is the group owner by including the information in the schedule change request message.

According to an embodiment, the schedule change request message may include at least one of information describing a current operating state, information describing a change time, and information describing a change interval.

According to an embodiment, the processor 120 may be configured to transmit the schedule change request message through the communication module 190, the schedule change request message being formatted according to a predefined peer-to-peer (P2P) presence request frame.

According to an embodiment, the P2P presence request frame may be configured to include at least one of an attribute field, a duration field, and an interval field.

According to an embodiment, the processor 120 may be configured to receive the response message through the communication module 190, the response message being formatted according to a predefined P2P presence response frame.

According to an embodiment, the P2P presence response frame may be configured to include a status code indicating a result of the schedule change request message.

According to an embodiment, the processor 120 may be configured to receive the response message through the communication module 190, the response message being formatted according to a predefined beacon frame.

According to an embodiment, the processor 120 may be configured to connect to the external electronic device through a second communication channel different from a first communication channel for wireless communication through the direct communication group, and transmit the schedule change request message through the second communication channel.

According to an embodiment, the processor 120 may be configured to identify the change in the operating state of at least one of the processor 120 or the communication module 190 according to a change in an operating state of an application providing a service through the direct communication group.

According to an embodiment, the processor 120 may be configured, responsive to identifying that the wireless communication includes being connected to an access point through periodic channel change based on time division, to generate the schedule change request message by including information on the periodic channel change.

Figure 3:
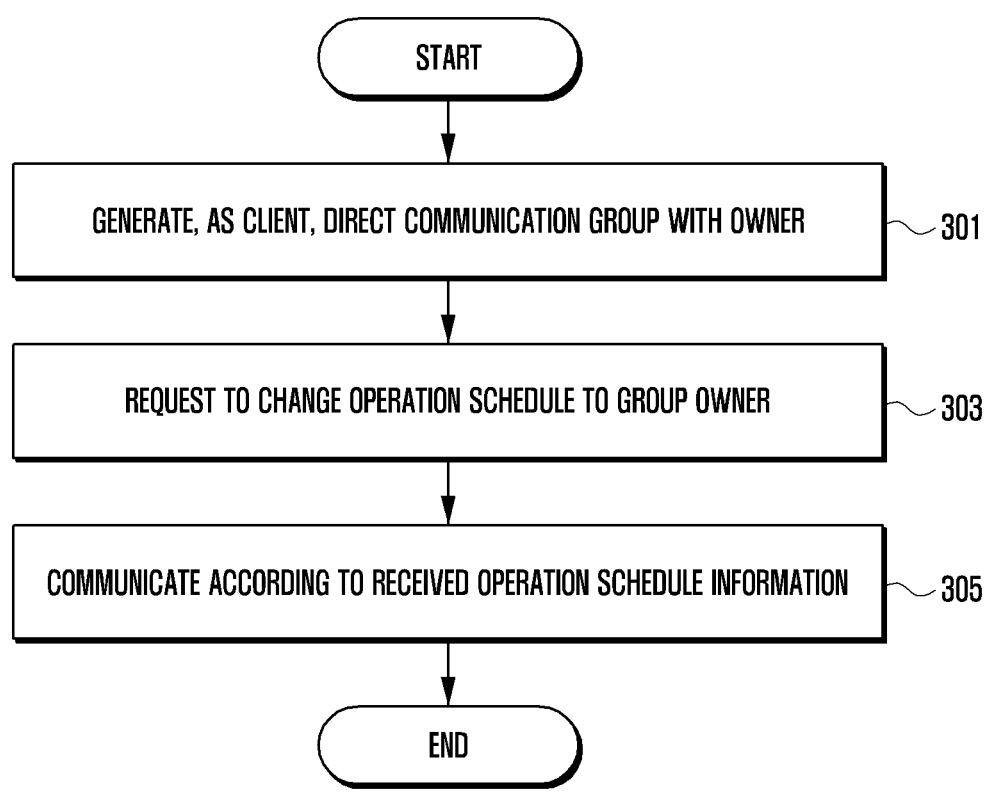
FIG. 3 is a flowchart illustrating a method of changing an operation schedule of a direct communication group by a group client according to one or more embodiments.

FIG. 3 is a flowchart illustrating a method of changing an operation schedule of a direct communication group by an electronic device (e.g., the electronic device 101 of FIG. 1 or FIG. 2) that is a group client according to one or more embodiments. Hereinafter, the operation of the electronic device 101 described may be performed through various elements and/or functions of the electronic device 101 as illustrated in FIG. 1 under the control of the processor (e.g., the processor 120 of FIG. 1).

According to one or more embodiments, in operation 301, the processor 120 of the electronic device 101 may generate a direct communication group in which the external electronic device 102 operates as the group owner and the electronic device 101 operates as a group client by performing Wi-Fi direct connection to an external electronic device (e.g., the electronic device 102 of FIG. 1 or FIG. 2) through a communication module (e.g., the communication module 190 of FIG. 1). For example, the electronic device 101 may form a direct communication group and perform wireless communication as a group client with the external electronic device 102 that is the group owner. An operation of forming a direct communication group will be described later in detail with reference to FIG. 4.

According to one or more embodiments, in operation 303, the processor 120 may transmit a message requesting a change in the operation schedule of the direct communication group to the external electronic device 102 that is the group owner, based on a change in the operating state of at least one of the processor 120 and the communication module 190, the change being related to wireless communication through the generated direct communication group.

According to one or more embodiments, the processor 120 may identify a change in the operating state of the processor 120 or the communication module 190 transmitting data through a communication channel with the external electronic device 102 that is the group owner.

According to an embodiment, the operating state of the processor 120 may include at least one of an active state (e.g., active) or an inactive state (e.g., sleep) in relation to wireless communication through a direct communication group.

According to an embodiment, the processor 120 may identify that the operating state of the processor 120 or the communication module 190 related to wireless communication through the direct communication group is changed according to the operating state of an application (e.g., the application 146 of FIG. 1) providing services through the direct communication group. For example, the service providing application 146 may include at least one of a data transmission service application, a multimedia playback service application, a document printing service application, a display service, a wireless docking service, or a wireless serial bus service. For example, the operating state of the application 146 may include an active state in which a service is provided by transmitting/receiving data with the external electronic device 102, that is the group owner of a direct communication group, by a service providing application or an inactive state in which the provision of services is at least temporarily suspended due to interruption of transmitting/receiving data.

According to one or more embodiments, the processor 120 may identify a change in the operating state of the communication module 190 that transmits data through a communication channel with the external electronic device 102 that is the group owner. For example, the operating state of the communication module 120 related to wireless communication through a direct communication group may include either an active state or an inactive state (e.g., sleep) of a communication channel with the external electronic device 102 that is the group owner. For example, while the communication module 120 is performing wireless communication through another communication channel that cannot coexist with a communication channel with the external electronic device 102 that is the group owner, the communication channel with the external electronic device 102 that is the group owner may be in an inactive state.

According to one or more embodiments, when an operating state of at least one of the processor 120 and the communication module 190 related to wireless communication through a direct communication group is changed, the processor 120 may generate a message requesting a change in the operation schedule of the direct communication group including changed operating state information and/or information on a time when the operating state information was changed, based on the change in the operating state.

According to an embodiment, when the operating state of the processor 120 or the communication module 190 is changed from an active state to an inactive state, the processor 120 may generate an operation schedule change request message including information on the change of the operating state. For example, the processor 120 may generate an operation schedule change request message including changed operating state information indicating that the operating state of the processor 120 or the communication module 190 has changed from an active state to an inactive state, or changed operating state information indicating that the operating state of the processor 120 or the communication module 190 has changed from an inactive state to an active state.

According to an embodiment, when the operating state of the processor 120 or the communication module 190 is periodically changed from an active state to an inactive state, the processor 120 may generate an operation schedule change request message including such operating state change information. For example, when the communication module 190 performs wireless communication through another communication channel that cannot coexist with the communication channel of the direct communication group through periodic channel change (e.g., multiple channel concurrency or multi-channel concurrency (MCC)), the processor 120 may generate an operation schedule change request message by including information on the periodic channel change including changed operating state information indicating that the operating state of the communication module 190 is periodically changed from an active state to an inactive state, change time information, and/or change interval information.

According to an embodiment, the processor 120 may transmit an operation schedule change request message generated through the communication module 190 to the external electronic device 102 that is the group owner. For example, the processor 120 may transmit the operation schedule change request message to the external electronic device 102 that is the group owner through a presence request frame, for example.

According to one or more embodiments, the processor 120 may receive a response message to the operation schedule change request message from the external electronic device 102 that is the group owner through the communication module 190. For example, the response message to the operation schedule change request message may include a response to the operation schedule change request of the direct communication group according to the operation schedule change request. For example, the response to the operation schedule change request may include a schedule change status code. For example, the schedule change status code may include a value corresponding to a result of the schedule change request (e.g., success, not available, or bad request).

According to one or more embodiments, in operation 305, when receiving a message including operation schedule information configured based on the operation schedule change request message from the external electronic device 102 that is the group owner, the processor 120 may control the communication module 190 according to operation schedule information included in the received message to perform wireless communication with the external electronic device 102 that is the group owner.

According to an embodiment, the external electronic device 102, that is the group owner, may identify information on a change in the operating state of the electronic device 101, that is a group client, based on the operation schedule change request transmitted from the electronic device 101 that is a group client. For example, when the current operating state is active or inactive according to a change in the operating state of the processor 120 or communication module 190 of the electronic device 101 that is a group client, based on this, the external electronic device 102 that is the group owner may determine an operation schedule of the direct communication group.

In an example, when the operating state of the external electronic device 102, that is the group owner, is changed to an inactive state according to a change in the operating state of the processor 120 or the communication module 190 of the electronic device 101 that is a group client, based on this operating state change information, the external electronic device 102 that is the group owner may determine an operation schedule so that the external electronic device 102 that is the group owner changes the communication channel of the direct communication group to an inactive state (e.g., sleep) for at least a specified time. In another example, because the operating state may be changed to an active state according to a change in the operating state of the processor 120 or the communication module 190 of the electronic device 101 that is a group client, the external electronic device 102 that is the group owner may determine an operation schedule so that so that the external electronic device 102, that is the group owner, changes the communication channel of the direct communication group to an active state for a specified time at least at a specified interval in order to receive various messages including an additional operation schedule request message from the electronic device 101 that is a group client.

In another example, when the operating state of the external electronic device 102, that is the group owner, is periodically changed from an active state to an inactive state according to a change in the operating state of the processor 120 or the communication module 190 of the electronic device 101 that is a group client, based on this operating state change information, the external electronic device 102 that is the group owner may determine an operation schedule so that the external electronic device 102 that is the group owner periodically changes the communication channel of the direct communication group to an inactive state (e.g., sleep) for at least a specified time according to the operating state change information.

According to one or more embodiments, a group client may receive a message including operation schedule information from the external electronic device 102 that is the group owner. For example, the operation schedule information of the external electronic device 102 that is the group owner may be configured as a schedule notification attribute (e.g., notice of absence attribute) and transmitted to the electronic device 101 that is a group client. For example, the schedule notification attribute may be included in a beacon, a probe response, and/or a separate notice of absence frame transmitted by the external electronic device 102 that is a group owner and transmitted.

Figure 4:
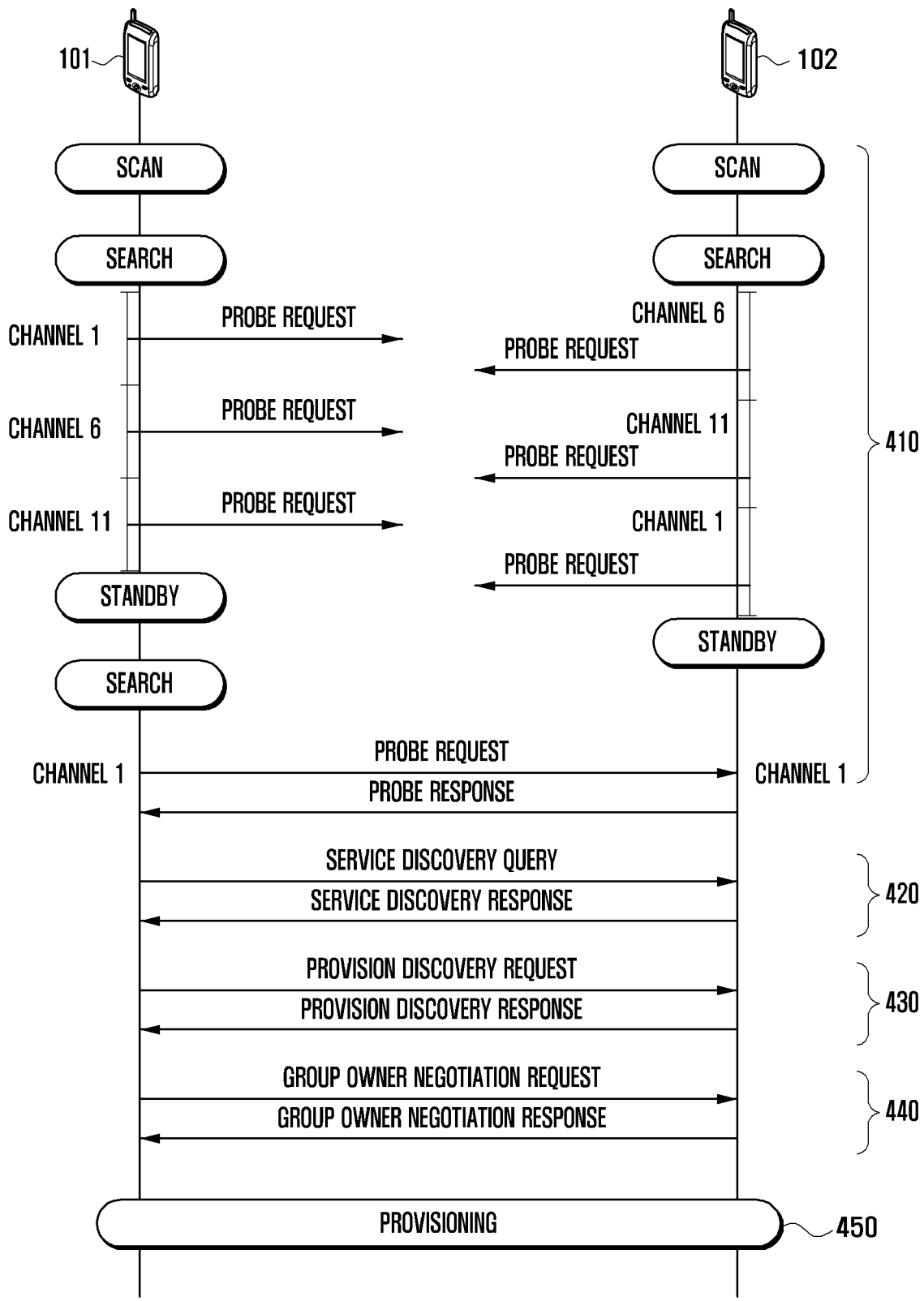
FIG. 4 is a signal flowchart illustrating an operation of generating a direct communication group according to one or more embodiments.

FIG. 4 is a signal flowchart illustrating an operation of generating a direct communication group (e.g., a WFD communication network) between an electronic device (e.g., the electronic device 101 of FIG. 1 or FIG. 2) and an external electronic device (e.g., the electronic device 102 of FIG. 1 or FIG. 2) according to one or more embodiments.

According to one or more embodiments, the electronic device 101 may perform a WFD device discovery in operation 410 to generate a direct communication group with the external electronic device 102.

For example, the electronic device 101 and the external electronic device 102 may perform the WFD electronic device discovery as they enter a WFD device discovery mode. For example, the electronic device 101 and the external electronic device 102 may drive the application that uses the WFD by the user's input or by automatically controlling the electronic device as suitable to the configurations of the respective devices, or enter the WFD device discovery mode according to the WSC (Wi-Fi simple configuration) request.

According to one or more embodiments, the electronic device 101 and the external electronic device 102 may perform WFD electronic device discovery by repeatedly performing a search to discover an electronic device and listen to a response received from another electronic device.

According to one or more embodiments, the electronic device 101 and the external electronic device 102 may perform a channel scan in a search state. For example, the scan may be repeatedly performed less than a specified number of times for all communicable channels (e.g., from channel 1 to channel 11) between the electronic device 101 and the external electronic device 102 or for social channels (channels 1, 6, and 11) for quick discovery. For example, the listen of the electronic device 101 operating as a group client may be limited to one of the social channels, and the selected channel may be fixed during the discovery process. For example, the scan may be performed in a scanning method according to an 802.11 standard protocol.

According to one or more embodiments, the electronic device 101 and the external electronic device 102 may maintain a standby state by selecting one of all channels or social channels in a standby state.

According to one or more embodiments, the electronic device 101 and the external electronic device 102 may perform the WFD device discovery by exchanging a probe request and a probe response. For example, the electronic device 101 may transmit the probe request to the external electronic device 102, and upon receiving the request, the external electronic device 102 may transmit the probe response to the electronic device 101. For example, the probe request may include a WFD information element (IE) and/or a WSC information element. For example, the probe response may include a WFD information element and/or a WSC information element.

According to one or more embodiments, the electronic device 101 and the external electronic device 102 may discover each other by reaching a common channel through repetition of search and listen. For example, the electronic device 101 and the external electronic device 102 may identify each other through the probe request or the probe response.

According to an embodiment, when a direct communication group is already formed before the WFD device discovery by the electronic device 101 and the external electronic device 102, any one of the electronic device 101 and the external electronic device 102 may be the electronic device that is the group owner. For example, when the external electronic device 102 forms the direct communication group as the electronic device that is the group owner, the electronic device 101 can discover the external electronic device 102 serving as the group owner through the WFD device discovery. In this case, the external electronic device 102 may receive the probe request received from the electronic device 101 while maintaining a standby state without performing a search.

According to one or more embodiments, the electronic device 101 may perform a service discovery with the external electronic device 102 in operation 420.

According to an embodiment, the electronic device 101 may perform a service discovery for exchanging information on a service provided by an upper layer in order to identify services compatible with the external electronic device 102.

According to an embodiment, the service discovery may be performed by using a service discovery query and a service discovery response. For example, the electronic device 101 may transmit the service discovery query to the external electronic device 102, and upon receiving the service discovery query, the external electronic device 102 may transmit the service discovery response to the electronic device 101.

According to an embodiment, the electronic device 101 may designate a service protocol type through a service discovery query and transmit service information suitable for the service protocol type as query data. For example, the external electronic device 102 may transmit a service protocol type and response data through the service discovery response.

Service discovery may be performed to determine a service between network-connected electronic devices in layer 3 when the electronic device 101 and the external electronic device 102 are connected over a MAC layer (layer 2). However, the service discovery may be flexibly performed at an arbitrary stage according to an arbitrary designation of an upper layer regardless of the MAC protocol.

For example, the service discovery may be performed to identify service protocols and/or service types supportable by the other party in advance when a WFD device discovery. Accordingly, it is possible to prevent a problem in which data sharing (e.g., file sharing) is impossible because service protocol types do not match after the electronic device 101 and the external electronic device 102 are connected.

According to one or more embodiments, in operation 430, the electronic device 101 may perform a provision discovery exchange with the external electronic device 102.

According to an embodiment, the electronic device 101 and the external electronic device 102 may perform the provision discovery exchange through a provision discovery request and a provision discovery response. For example, the electronic device 101 may transmit the provision discovery request to the external electronic device 102, and upon receiving the request, the external electronic device 102 may transmit the provision discovery response to the electronic device 101.

According to an embodiment, the provision discovery request may include a WSC configuration method. For example, the WSC configuration method may be any one of PBC, PIN from Display, and PIN from Keypad. For example, it may be determined by the electronic device 102 receiving the WSC configuration method.

According to an embodiment, the external electronic device 102 that has received the provision discovery request may notify the user by displaying that the provision search discovery has been received on a display. For example, when the provision discovery request includes the WSC configuration method, the external electronic device 102 may display information on the WSC configuration method on a display. For another example, the external electronic device 102 may display a PIN according to the WSC configuration method or display information on the WSC configuration method in the form of displaying a window for inputting a PIN. For another example, the external electronic device 102 may allow the user to decide whether to accept the connection and configure the WSC by displaying information including the name of the electronic device 101 that transmitted the provision discovery request and/or the WSC configuration method in a pop-up form to notify the user.

According to one or more embodiments, in operation 440, the electronic device 101 and the external electronic device 102 may perform group owner negotiation. For example, the electronic device 101 and the external electronic device 102 may determine an electronic device to operate as the group owner of a direct communication group to be formed.

According to an embodiment, the electronic device 101 may determine the group owner (e.g., the external electronic device 102) by exchanging the group owner negotiation request and the group owner negotiation response/approval with the external electronic device 102.

According to an embodiment, the electronic device 101 and the external electronic device 102 may determine the group owner electronic device by comparing designated group owner intents. For example, the electronic device 101 and the external electronic device 102 determine the group owner electronic device, based on information such as attributes, operating channels, and listen timing of the direct communication group to be formed. For example, when the direct communication group has already been formed, because one of the electronic device 101 and the external electronic device 102 may already be the group owner electronic device, group owner negotiation may be omitted.

According to one or more embodiments, in operation 450, the electronic device 101 may perform provisioning with the external electronic device 102.

According to an embodiment, the external electronic device 102 may operate as a WSC registrar as the group owner, and the electronic device 101 may operate as a WSC enrollee as a group client, and the provisioning exchanging credentials may be performed.

According to one or more embodiments, the electronic device 101 and the external electronic device 102 may form a direct communication group according to the provisioning. For example, the external electronic device 102 may operate as the group owner electronic device by registering the electronic device 101 as a group client and controlling direct communication group access of the group client in an actual operation channel. For example, the electronic device 101, as a group client, may be connected to the external electronic device 102, as the group owner, through a credential identified through the provisioning, and transmit/receive data through a WFD connection.

According to an embodiment, the electronic device 101 that has performed the provision discovery request may transmit a periodic probe request to the external electronic device 102 to identify whether a session of the external electronic device 102, that is the WSC registrar, is in an enabled state.

According to an embodiment, when accepting the connection of the electronic device 101, the external electronic device 102 may switch the session of the external electronic device 102 to an operable state and transmit a periodic probe response to the electronic device 101.

Figure 5:
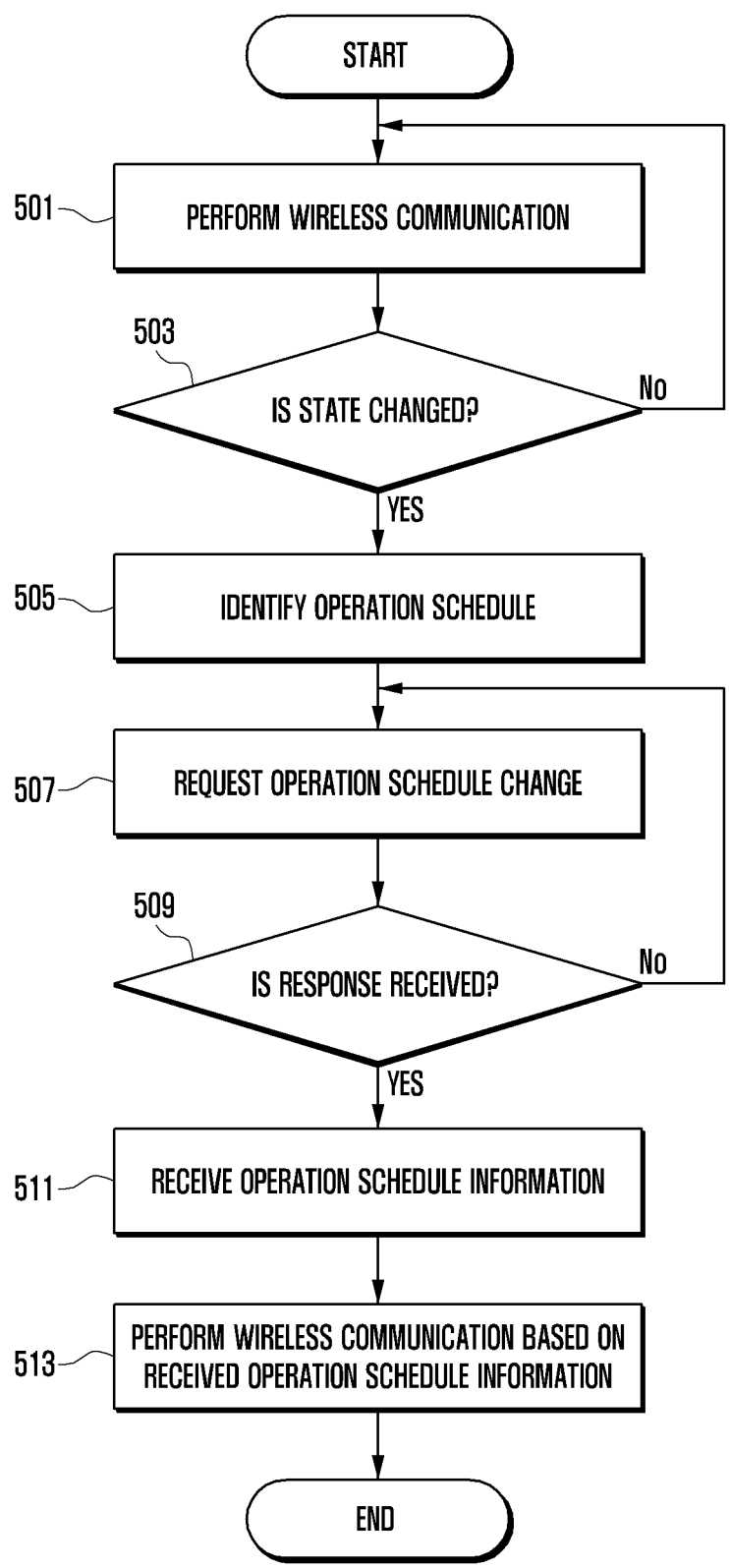
FIG. 5 is a flowchart illustrating a method of changing an operation schedule of a direct communication group based on a state change of an electronic device that is a group client according to one or more embodiments.

FIG. 5 is a flowchart illustrating a method of changing an operation schedule of a direct communication group based on a state change of an electronic device (e.g., electronic device 101 of FIG. 1 or FIG. 2) that is a group client according to one or more embodiments. The operation of the electronic device 101 described below may be performed through various elements and/or functions of the electronic device 101 as illustrated in FIG. 1 under the control of a processor (e.g., the processor 120 of FIG. 1).

According to one or more embodiments, in operation 501, the processor 120 of the electronic device 101 may perform wireless communication with the external electronic device 102—that is, the group owner—as a group client within a direct communication group in which the external electronic device 102 operates as the group owner through a Wi-Fi direct connection with an external electronic device (e.g., the electronic device 102 of FIG. 1 or FIG. 2) through a communication module (e.g., the communication module 190 of FIG. 1). For example, in addition to performing wireless communication with the external electronic device 102, that is the group owner, as a group client within the direct communication group, the electronic device 101 may communicate with the external electronic device 102 that is the group owner or another electronic device (e.g., the electronic device 201 or 202 of FIG. 2) according to a different communication standard, for example, a standard such as wireless fidelity (Wi-Fi), Bluetooth, Bluetooth Low Energy (BLE), Zigbee, or near field communication (NFC). For example, the external electronic device 102 may perform wireless communication as the group owner not only with the electronic device 101 within the direct communication group but also with another electronic device (e.g., the electronic device 201 or 202 of FIG. 2) additionally operating as a group client, and may also perform wireless communication according to another communication standard.

According to one or more embodiments, in operation 503, the processor 120 may identify whether an operating state of at least one of the processor 120 and the communication module 190 is changed in relation to wireless communication through the direct communication group.

For example, the operating state of the processor 120 may change from an active state (e.g., active) to an inactive state (e.g., sleep) or vice versa in relation to wireless communication through the direct communication group.

According to an embodiment, the processor 120 may identify that the operating state of the processor 120 or the communication module 190 related to wireless communication through the direct communication group is changed, depending on the operating state of an application (e.g., the application 146 of FIG. 1) providing service through the direct communication group. For example, the operating state of the application 146 may be changed from an active state in which a service is provided by transmitting/receiving data with the external electronic device 102 that is the group owner of the direct communication group by a service providing application to an inactive state in which data transmission and reception is stopped so that service provision is at least temporarily stopped, or vice versa from an inactive state to an active state.

Figure 6:
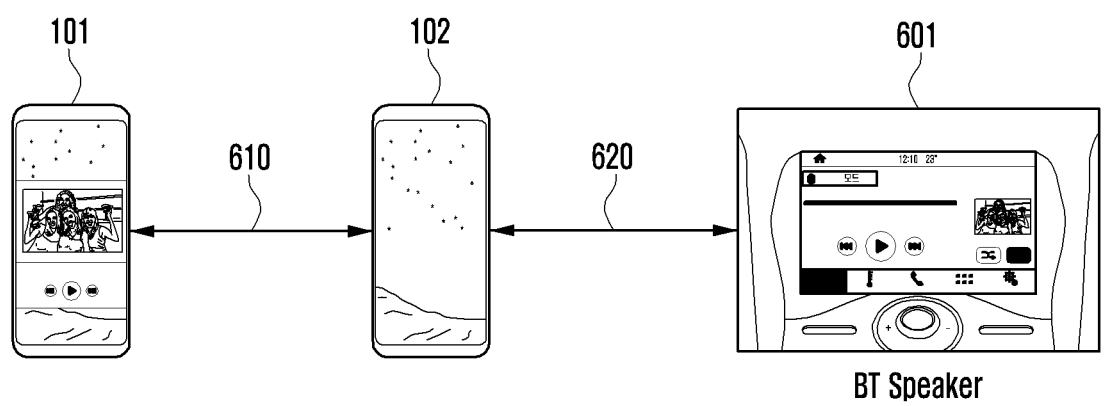
FIG. 6 is a network structure diagram illustrating an example of changing an operation schedule of a direct communication group by an electronic device that is a group client according to one or more embodiments.

FIG. 6 is a network structure diagram illustrating an example of changing an operation schedule of a direct communication group by an electronic device 101 acting as a group client according to one or more embodiments. For example, the electronic device 101 may load a music share service application, deliver audio data to a Bluetooth speaker 601 through an external electronic device 102 acting as a group owner, and play music.

Referring to FIG. 6, the external electronic device 102 may be connected to the Bluetooth speaker 601 through a Bluetooth wireless communication channel 620.

According to one or more embodiments, the processor 120 of the electronic device 101 may, as a group client, perform wireless communication through a WFD communication channel 610 by forming a direct communication group through the communication module 190 with the external electronic device 102 that is the group owner, through a music sharing service application for playing music by using the Bluetooth speaker 601. For example, as the music sharing service application using the WFD service is driven, the processor 120, as a group client, may enter the WFD electronic device discovery mode, form a direct communication group with the external electronic device 102 through the communication module 190, and transmit audio data through the direct communication channel 610 to the external electronic device 102 that is the group owner.

According to an embodiment, the external electronic device 102 that is the group owner may transmit audio data received from the group client electronic device 101 to the Bluetooth speaker 601 through the Bluetooth communication channel 620 to output music.

In an embodiment, when the music sharing service application pauses while playing music, the processor 120 may identify, through the communication module 190, a change in the operating state of the processor 120 driving the music sharing service application or a change in the operating state of the WFD channel 610 through which data is transmitted through the music sharing service application as the operating state of the corresponding music sharing service application changes from an active state (e.g., playing music) to an inactive state (e.g., pause).

According to one or more embodiments, the processor 120 may identify a change in the operating state of the communication module 190 that transmits data through a communication channel with the external electronic device 102 that is the group owner. For example, an operating state of the communication module 190 related to wireless communication through the direct communication group may include one of an active state or an inactive state (e.g., sleep) according to an operating state of a communication channel with the external electronic device 102 that is the group owner. For another example, while the communication module 190 performs wireless communication through another communication channel that cannot coexist with the communication channel with the external electronic device 102 that is the group owner, the communication channel with the external electronic device 102 that is the group owner may be in an inactive state.

Figure 7:
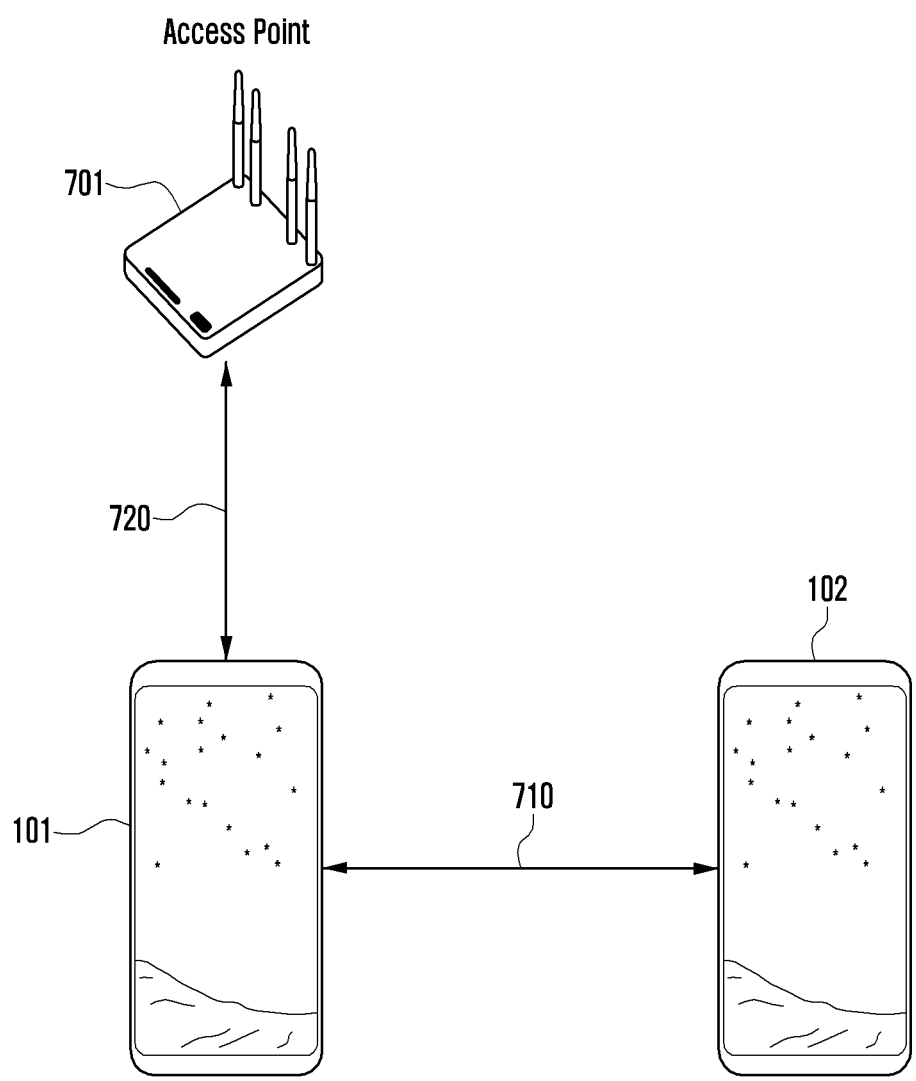
FIG. 7 is a network structure diagram illustrating another example of changing an operation schedule of a direct communication group by an electronic device that is a group client according to one or more embodiments.

FIG. 7 is a network structure diagram illustrating another example of changing an operation schedule of a direct communication group by an electronic device 101 acting as a group client according to one or more embodiments. For example, the electronic device 101, as a group client, may operate in a multiple channel concurrency (MCC) mode, form a direct communication group according to the WFD technology, communicate by being connected to an external electronic device 102, acting as the group owner, through a WFD communication channel 710 (e.g., channel 149), and perform wireless communication by being connected to an access point 701 through a Wi-Fi communication channel 720 (e.g., channel 36) through channel switching.

According to an embodiment, because the WFD communication channel 710 and the Wi-Fi communication channel 720 cannot coexist, the electronic device 101 may communicate through two communication channels by periodically switching channels based on a time division approach according to the MCC mode.

Figure 8:
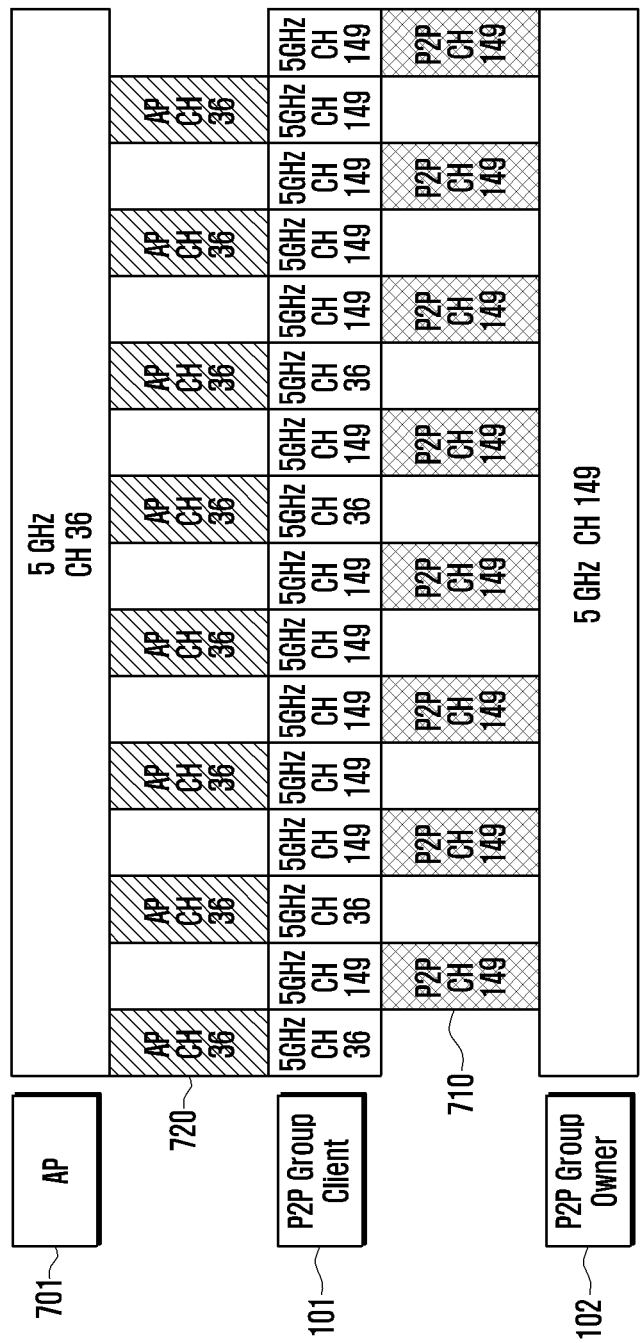
FIG. 8 is a diagram illustrating channel switching of FIG. 7 according to one or more embodiments.

FIG. 8 is a diagram illustrating channel switching in, for example, the network structure illustrated in FIG. 7, according to one or more embodiments. Referring to FIG. 8, by periodically switching channels based on time division, the electronic device 101 may alternate between periods of communication with the external electronic device 102 (group owner) through the WFD communication channel 710 (e.g., channel 149) and periods of communication with the access point 701 through the Wi-Fi communication channel 720 (e.g., channel 36).

According to an embodiment, as the electronic device 101 does not communicate with the external electronic device 102 that is the group owner through the WFD communication channel 710 (e.g., channel 149) during the periods of communication with the access point 701 through the Wi-Fi communication channel 720 (e.g., channel 36), data transmission of the communication module 190 through the WFD communication channel 710 may be temporarily in an inactive state.

According to an embodiment, the processor 120 may periodically identify that it is in an inactive state without data transmission through the WFD communication channel 710 by identifying the operating state of the communication module 190, as the wireless communication channel is periodically changed from the WFD communication channel 710 to the Wi-Fi communication channel 720.

Referring again to FIG. 5, according to one or more embodiments, in operation 505, the processor 120 may identify an operation schedule of the direct communication group, based on the operating state change when the operating state of at least one of the processor 120 and the communication module 190 related to wireless communication through the direct communication group is changed.

According to an embodiment, the processor 120 may identify operating state change information including change time information together with occurrence of a change in an operating state when the operating state of the processor 120 or the communication module 190 is changed from an active state to an inactive state. For example, referring again to FIG. 6, when music playback is paused in a music sharing service application, the processor 120 may identify a change in the operating state of the communication module 190 according to a change in the state of the WFD communication channel 610 used by the music sharing service application or a change in the operating state of the processor 120 driving the music sharing service application, and from this, may identify operating state change information including current operating state information and change time information according to a change in the operating state.

According to an embodiment, the processor 120 may identify operating state change information including the change interval and time information of the operating state when the operating state of the processor 120 or the communication module 190 is changed from an active state to an inactive state. For example, referring again to FIGS. 7 and 8, when the electronic device 101 alternately performs communication with the external electronic device 102 that is the group owner through the WFD communication channel 710 (e.g., channel 149) and communication with the access point 701 through the Wi-Fi communication channel 720 (e.g., channel 36) by periodically switching channels based on time division according to the MCC mode, the processor 120 may identify the operating state of the processor 120 or the communication module 190 and identify the operating state change information including the interval and time information of an inactive state without data transmission through the WFD communication channel 710.

According to one or more embodiments, in operation 507, the processor 120 may generate an operation schedule change request message and transmit the same to the external electronic device 102 that is the group owner.

According to an embodiment, the operation schedule change request message may include operating state change information. For example, if music playback is paused in a music sharing service application as described with reference to FIG. 6, the operation schedule change request message may include information describing the current (changed) operating state as identified by the processor 120 (e.g., "inactive") and information describing the change time (e.g. the time that the music was paused). For another example, if periodic channel change occurs for the communication module 190 as described with reference to FIG. 7 or FIG. 8, the operation schedule change request message may include information describing the change interval (e.g. the duration of each period of activity) and information describing the change time (e.g. the time of the last periodic change).

According to an embodiment, the processor 120 may generate a direct communication group operation schedule to be requested from the group owner based on the operating state change information, and transmit an operation schedule change request message including the generated operation schedule to the group owner.

Figure 9:
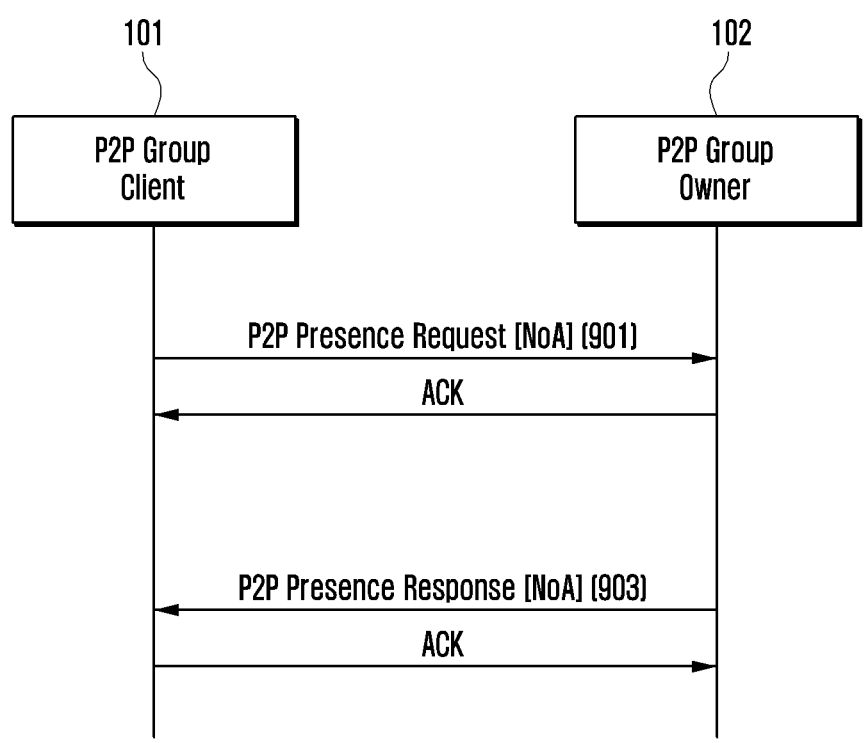
FIG. 9 is a signal flowchart illustrating an example of transmitting/receiving an operation schedule change request message and a response message from a group client according to one or more embodiments.

FIG. 9 is a signal flowchart illustrating an example of transmitting/receiving an operation schedule change request message and a response message from an electronic device 101 that is a group client according to one or more embodiments. Referring to FIG. 9, the processor 120 of the electronic device 101 that is a client of the P2P group, for example, may transmit an operation schedule change request message (e.g., operation 507 of FIG. 5) to the external electronic device 102 that is the group owner, formatting the message according to a predefined peer-to-peer (P2P) presence request frame, at 901. The predefined frame may be a P2P presence request frame as defined in the IEEE 802.11 Alliance Technical Standard, and such will be used herein for convenience, but other frame formats are also within the scope of the disclosure.

FIG. 10 is an example of a P2P presence request frame structure for transmitting the operation schedule change request message of, for example, FIG. 9, according to one or more embodiments. Referring to FIG. 10, the P2P presence request frame may include an action frame that the group client may transmit to the group owner. The group client may configure a P2P Action Subtype field to "P2P presence request" at 1001, and may display operation schedule information by including, for example, a schedule notification attribute (e.g., notice of absence) field 1003. For example, the schedule notification attribute field 1003 may include at least one of an attribute type field capable of indicating that the P2P attribute type is operation schedule information, an attribute length that may indicate the length of operation schedule information, a duration that may indicate the length of an operating period, or an interval that may indicate an operating state change interval.

According to one or more embodiments, as an example of transmitting the operation schedule change request message through the P2P presence request frame, the processor 120 may transmit an operation schedule change request message through various configurable wireless communication channels with the external electronic device 102. For example, the processor 120 may transmit the operation schedule change request message through a Bluetooth or BLE communication channel connected to the external electronic device 102.

Referring again to FIG. 5, according to one or more embodiments, in operation 509, the processor 120 may identify whether a response to the transmitted operation schedule request message is received. For example, if no response is received from the external electronic device 102 that is the group owner, the processor 120 may repeatedly transmit the operation schedule request message up to a specified number of times. According to an embodiment, when the processor 120 does not receive a response from the external electronic device 102 that is the group owner while repeatedly transmitting the operation schedule request message up to the specified number of times, the processor 120 may identify that the external electronic device 102, that is the group owner, is in a state in which the schedule cannot be changed, and may stop the operation schedule change request. According to an embodiment, the processor 120 may identify a change in the operating state of the processor 120 or the communication module 190 after a predetermined period of time and transmit the operation schedule change request to the external electronic device 102 that is the group owner.

Referring again to FIG. 9, for example, the processor 120 may receive the response message to the operation schedule change request message (e.g., operation 507 of FIG. 5) from the external electronic device 102 that is the group owner, formatting the message according to a predefined peer-to-peer (P2P) presence response frame, at 903. The predefined frame may be a P2P presence response frame as defined in the IEEE 802.11 Alliance Technical Standard, and such will be used herein for convenience, but other frame formats are also within the scope of the disclosure.

FIG. 11 is an example of a P2P presence response frame structure for receiving the operation schedule change response message of FIG. 9 according to one or more embodiments. Referring to FIG. 11, the P2P presence response frame may be a response action frame to an action frame transmitted from a group client to the group owner. The group owner may configure a P2P Action Subtype field to "P2P presence response" at 1101, and for example, may include a schedule change status code 1103 as a response to the P2P presence request frame for a schedule change request. For example, the status code 1103 may include a value corresponding to a result of a schedule change request (e.g., success, not available, or bad request). According to an embodiment, the P2P presence response frame may additionally include a schedule notification attribute (e.g., notice of absence) field.

According to one or more embodiments, as an example of receiving the operation schedule change response message through the P2P presence response frame, the processor 120 may receive an operation schedule change response message through various configurable wireless communication channels with the external electronic device 102. For example, the processor 120 may receive the operation schedule change response message through a Bluetooth or BLE communication channel connected to the external electronic device 102.

Referring again to FIG. 5, according to one or more embodiments, in operation 511, the processor 120 may receive a message including operation schedule information from the external electronic device 102 that is the group owner. For example, the message including operation schedule information transmitted from the external electronic device 102 that is the group owner may be received through a beacon frame or a P2P presence request frame. In an embodiment, when an operation schedule change response message including the status code 1103 indicating success as a result of the schedule change request is received, the processor 120 may receive a message including operation schedule information configured based on the operation schedule change request message from the external electronic device 102 that is the group owner. In an embodiment, when an operation schedule change response message including a code other than the status code 1103 indicating success as a result of the schedule change request is received, or when no operation schedule change response message is received for a predetermined period of time, the processor 120 may receive a message including existing operation schedule information from the external electronic device 102 that is the group owner.

According to one or more embodiments, in operation 513, the processor 120 may perform wireless communication with the external electronic device 102, that is the group owner, as a group client of the direct communication group, based on the received operation schedule information.

According to an embodiment, operation schedule information may be configured based on an operation schedule change request transmitted from the electronic device 101 that is a group client. For example, when the current operating state is changed to an active state or an inactive state according to a change in the operating state of the processor 120 or communication module 190 of the electronic device 101 that is a group client, based on this operating state change information, the operation schedule information may be configured to change the communication channel of the direct communication group to an inactive state (e.g., sleep) for at least a specified period of time. For another example, the operation schedule information may be configured to change the communication channel of the direct communication group to an active state at least for a specified interval and for a specified time in order to receive various messages including an additional operation schedule request message from the electronic device 101 that is a group client.

For another example, when the operating state is periodically changed from an active state to an inactive state according to a change in the operating state of the processor 120 or communication module 190 of the electronic device 101 that is a group client, based on this operating state change information, the operation schedule information may be configured to change the communication channel of the direct communication group to an inactive state (e.g., sleep) for at least a periodically specified period of time.

According to one or more embodiments, a message including operation schedule information received from the external electronic device 102 that is the group owner may include a schedule notification attribute (e.g., notice of absence attribute). For example, the schedule notification attribute may be transmitted to the electronic device 101 that is a group client through a beacon frame and a probe response frame transmitted by the external electronic device 102 that is the group owner, and/or a separate notice of absence frame. These frames may be defined in the IEEE 802.11 Alliance Technical Standard, but other frame formats are also within the scope of the disclosure.

FIGS. 12A and 12B are diagrams illustrating a structure of a message including operation schedule information of the group owner according to one or more embodiments.

According to one or more embodiments, operation schedule information may include a schedule notification attribute (e.g., notice of absence attribute) as illustrated in FIGS. 12A and 12B. For example, the schedule notification attribute may be included in a beacon and a probe response transmitted by the external electronic device 102 that is a group owner, and/or a separate notice of absence frame and transmitted to the electronic device 101 that is a group client.

According to an embodiment, the schedule notification attribute (e.g., notice of absence) may include an attribute ID field 1201, a length field 1202 that can indicate the length of the body of the schedule notification attribute, and/or an index field 1203 that can indicate the timing of the schedule notification. For example, the schedule notification attribute may include at least one of a count/type field 1206, a duration field 1207, an interval field 1208 and/or a start time 1209 to indicate a schedule notification schedule.

According to an embodiment, the count field 1206 may indicate the number of absence intervals. According to an embodiment, the duration field 1207 may indicate a maximum duration after the start of the absence interval. According to an embodiment, the interval field 1208 may indicate the length of the absence interval. According to an embodiment, the start time field 1209 may indicate a time at which the absence interval is started by a timer.

Figure 13:
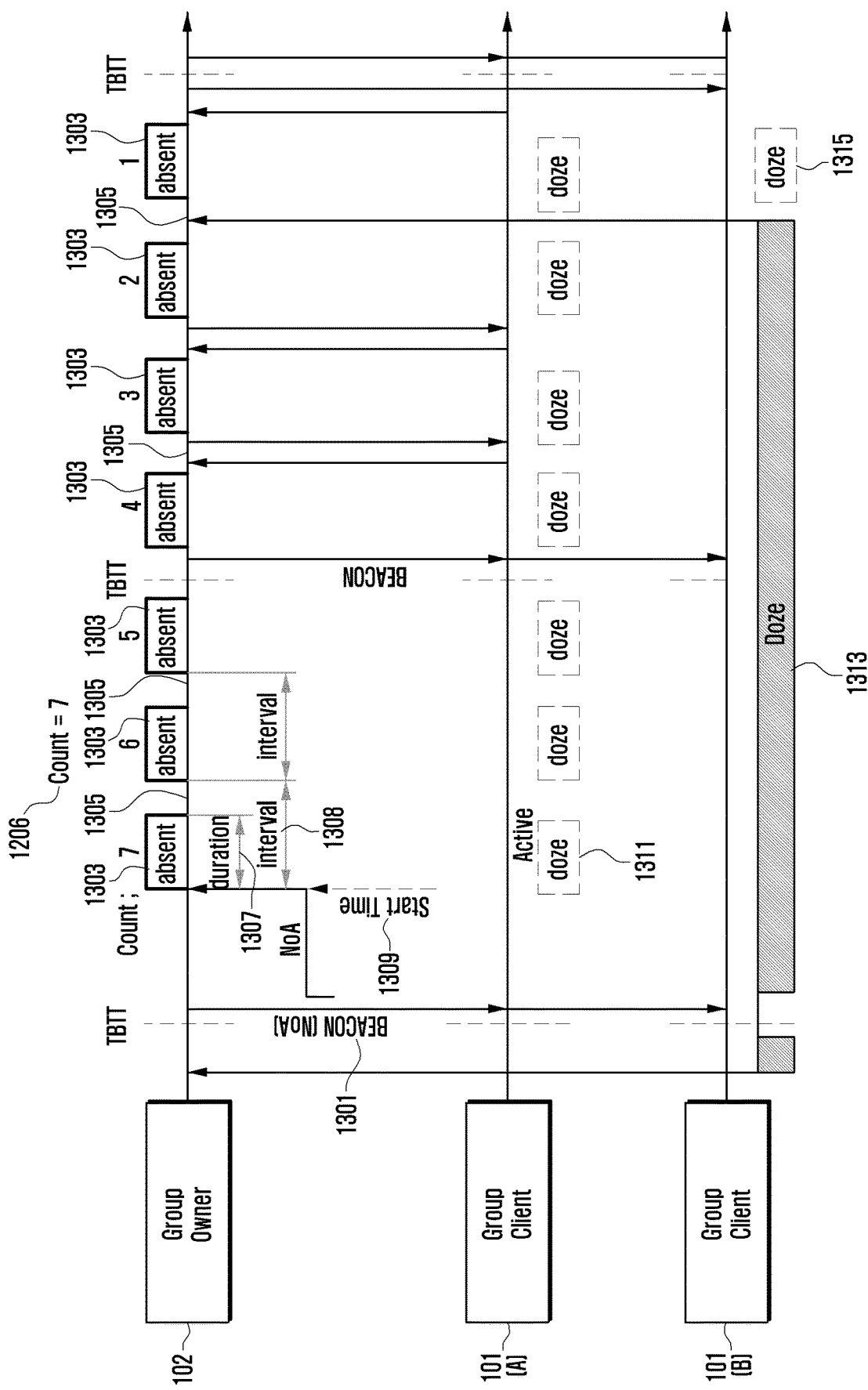
FIG. 13 is a diagram illustrating an example of an operation of performing communication by a direct communication group according to operation schedule information of an external electronic device that is the group owner according to one or more embodiments.

FIG. 13 is a diagram illustrating an example of an operation of performing communication by a direct communication group according to operation schedule information of the group owner according to one or more embodiments.

Referring to FIG. 13, the group owner (e.g., the external electronic device 102 of FIG. 1 or FIG. 2) may transmit a schedule notification attribute (e.g., notice of absence attribute) to the electronic device 101 that is a group client by including the same in the beacon frame 1301.

According to an embodiment, the external electronic device 102 that is the group owner can control the radio channel of the direct communication group according to schedule information included in schedule notification attributes (e.g., notice of absence). For example, the external electronic device 102 that is the group owner can make a first absent period 1303 start, based on a timer value 1309 included in the start time field 1209. For example, when the absent period starts, the external electronic device 102, that is the group owner, can switch to a power save state for a duration 1307 included in the time duration field 1207. For example, when the absent period 1303 ends, the external electronic device 102, that is the group owner, may enter a presence period 1305 and transmit/receive data through the communication channel of the direct communication group until the next interval 1308 starts. For example, the interval 1308 of the absent period 1303 is included in the interval field 1208 of the schedule notification attribute, and the external electronic device 102, that is the group owner, may start the absent period 1303 of the next interval when the timer value advances by a time obtained by adding the interval 1308 to the timer value 1309 included in the start time field 1209. For example, the external electronic device 102 that is the group owner may repeat the absent period as many times as the number (e.g., 7 times) 1306 included in the count/type field 1206.

According to an embodiment, in an example (A), the group client (e.g., the electronic device 101 of FIG. 1 or 2) may periodically enter an inactive state (doze) 1311, based on the operation schedule information included in the schedule notification attribute transmitted from the external electronic device 102 that is the group owner, according to interval of the absent 1303 of the external electronic device 102 that is the group owner.

According to an embodiment, in another example (B), the electronic device 101, that is a group client, may enter an inactive state (doze) 1313 according to a change in the operating state of the processor 120 or communication module 190 occurring in the electronic device 101, that is a group client. When the inactive state of the electronic device 101, that is a group client, is terminated and the operating state is changed to an active state, the electronic device 101, that is a group client, may transmit/receive data to the external electronic device 102 that is the group owner during the presence period 1305 in which the external electronic device 102, that is the group owner, is activated, based on the existing operation schedule information of the external electronic device 102 that the group owner. Thereafter, the electronic device 101, that is a group client, may enter an inactive state (doze) 1315 in the absent period 1303 of the external electronic device 102 that is the group owner, based on operation schedule information of the external electronic device 102 that the group owner.

Figure 14A:
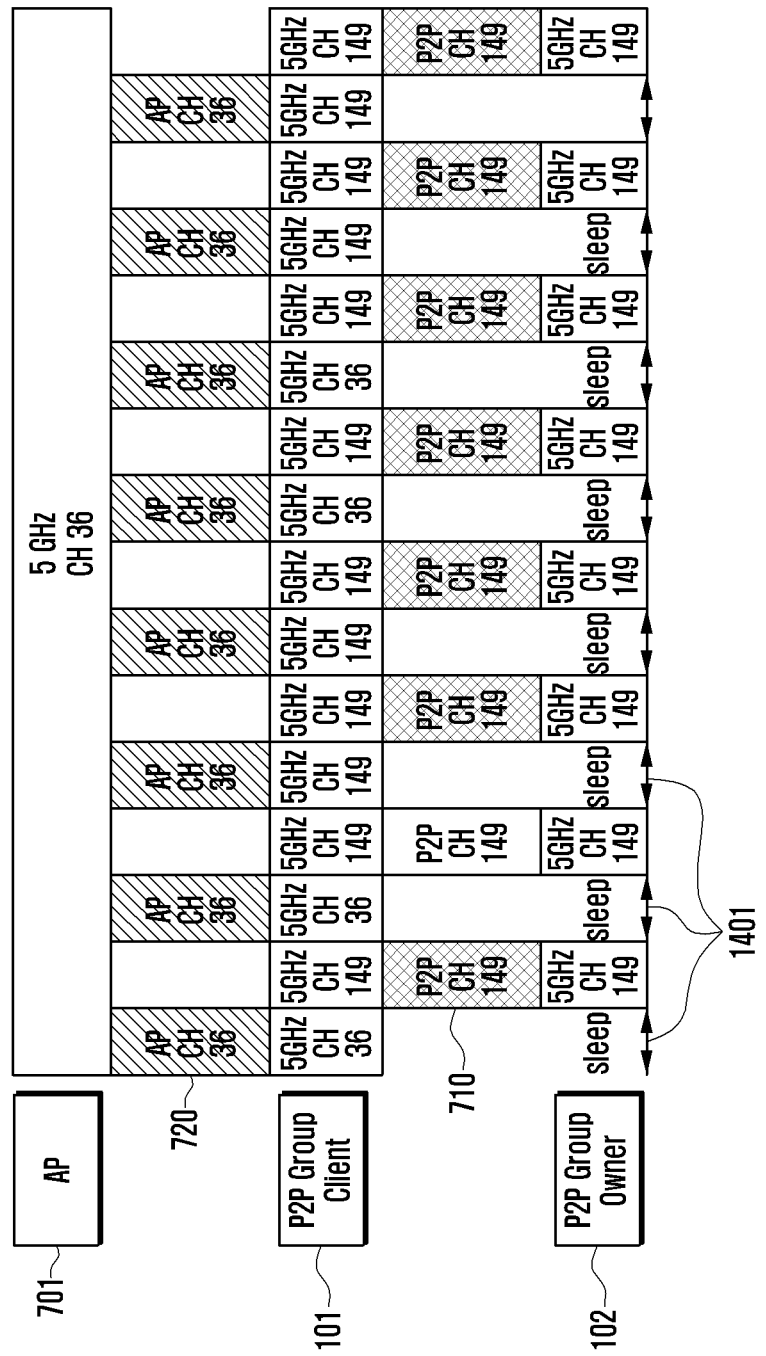
FIGS. 14A and 14B are diagrams illustrating a sleep operation of an external electronic device that is the group owner according to operation schedule information of an external electronic device that is the group owner according to one or more embodiments.
Figure 14B:
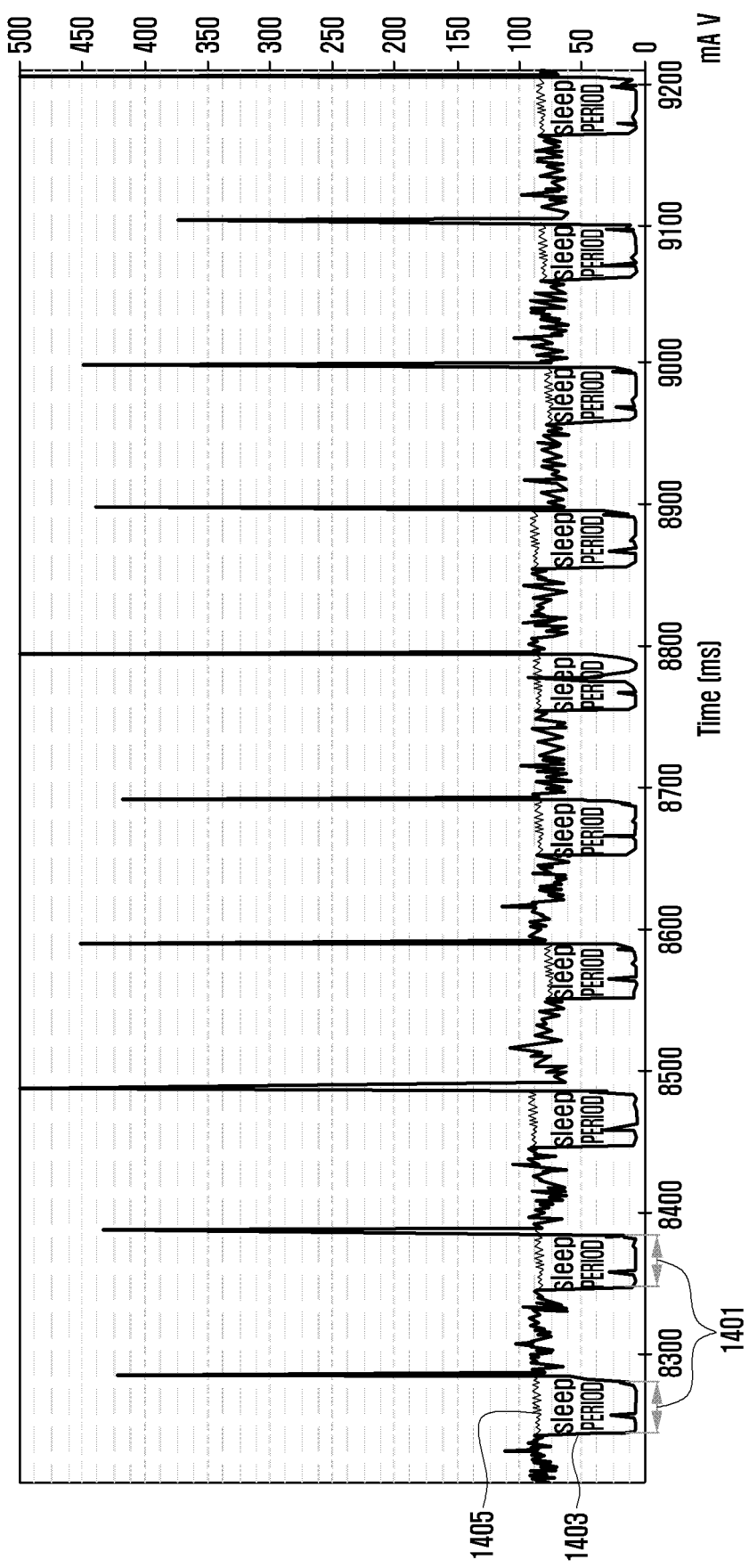

FIGS. 14A and 14B are diagrams illustrating a sleep operation of an external electronic device 102 that is the group owner according to operation schedule information of an external electronic device (e.g., the external electronic device 102 of FIG. 1 or FIG. 2) that is the group owner according to one or more embodiments.

Referring to FIGS. 14A and 14B, for example, the electronic device (e.g., the electronic device 101 of FIG. 1 or FIG. 2) may periodically repeat an operation of communicating with the external electronic device 102 that is the group owner of the direct communication group through the first communication channel (e.g., the WFD communication channel 710 of FIG. 7) and an operation of communicating with the access point (e.g., the access point 701 of FIG. 7) through the second communication channel (e.g., the Wi-Fi communication channel 720 of FIG. 7), while periodically switching channels through time division.

According to one or more embodiments, while communicating with the access point 701 through the first communication channel 720, the electronic device 101 may enter a period of no communication with the external electronic device 102 that is the group owner through the second communication channel 710, and accordingly, data transmission of the communication module 190 through the second communication channel 710 may be in an inactive state. According to an embodiment, the electronic device 101 may identify the change in the operating state of the communication module 190, and transmit a schedule change request message including operating state change information in which the second communication channel is changed to an inactive state to the external electronic device 102 that is the group owner. Accordingly, the external electronic device 102, that is the group owner, may configure schedule information, and for example, configure its own sleep period 1401 for a period at least included in a period in which the electronic device 101, that is a group client, does not periodically use the second communication channel, and then enter an inactive state for at least one such period. In this example, an example in which the electronic device 101, that is a group client, is periodically changed to an inactive state has been described, but one or more embodiments are not limited thereto and may be applied even when the electronic device 101, that is a group client, is non-periodically deactivated.

Referring to FIG. 14B, this is a graph illustrating a current consumption waveform 1403 when the external electronic device 102, that is the group owner, configures a sleep period 1401 and a current consumption waveform 1405 when the external electronic device 102, that is the group owner, does not configure the sleep period 1401. Referring to the graph, it may be identified that the power consumption of the external electronic device 102, that is the group owner, is actually reduced, as the external electronic device 102, that is the group owner, configures the sleep period 1401.

FIG. 15 is a diagram illustrating an effect of reducing power consumption of the group owner (e.g., the external electronic device 102 of FIG. 1 or FIG. 2) according to a change in an operation schedule of a direct communication group by an electronic device (e.g., the electronic device 101 of FIG. 1 or FIG. 2) that is a group client according to one or more embodiments. Referring to FIG. 15, as the absent period (NoA) of the external electronic device 102, that is the group owner, increases, the average power consumption of the external electronic device 102, that is the actual group owner, is reduced.

The external electronic device 102 that is the group owner may form a group with a plurality of client electronic devices (e.g., the electronic device 101, the electronic device 201, and/or the electronic device 202). According to an embodiment, the external electronic device 102, that is the group owner, may receive a schedule change request message from two or more client electronic devices, generate operation schedule information based on the received schedule change request message, and transmit the same to the two or more client electronic devices.

The embodiments disclosed in the disclosure are only presented as examples to easily explain technical content and aid understanding, and are not intended to limit the scope of the technology disclosed in the disclosure. Therefore, the scope of the technology disclosed in the disclosure should be interpreted as including all changes or modified forms derived based on the technical idea of various embodiments disclosed in the disclosure in addition to the embodiments disclosed herein.

What is claimed is:

1. An electronic device comprising:
communication circuitry;
at least one processor including processing circuitry; and
memory configured to store instructions which, when executed by the at least one processor individually or collectively, cause the electronic device to:
generate a direct communication group in which an external electronic device operates as a group owner and the electronic device operates as a group client through a Wi-Fi direct connection with the external electronic device, to perform wireless communication;
transmit, through the communication circuitry to the external electronic device operating as the group owner, a schedule change request message requesting to change an operation schedule of the direct communication group, based on at least one of the at least one processor or the communication circuitry entering an inactive state from an active state, or entering the active state from the inactive state, according to a change in an operating state of an application executed by the electronic device which provides a service through the direct communication group;
receive, through the communication circuitry from the external electronic device operating as the group owner, a response message comprising operation schedule information configured based on the schedule change request message; and
perform the wireless communication according to the operation schedule information of the response message received from the external electronic device operating as the group owner.

2. The electronic device of claim 1, wherein the schedule change request message comprises at least one of information describing a current operating state, information describing a change time, or information describing a change interval.

3. The electronic device of claim 1,
wherein the instructions, when executed by the at least one processor individually or collectively, further cause the electronic device to control the communication circuitry to transmit the schedule change request message in a peer-to-peer (P2P) presence request frame, and
wherein the P2P presence request frame comprises at least one of an attribute field, a duration field, or an interval field.

4. The electronic device of claim 3,
wherein the instructions, when executed by the at least one processor individually or collectively, further cause the electronic device to receive, through the communication circuitry, the response message in a P2P presence response frame, and wherein the P2P presence response frame comprises a status code indicating a result of the schedule change request message.

5. The electronic device of claim 1, wherein the instructions, when executed by the at least one processor individually or collectively, further cause the electronic device to receive, through the communication circuitry, the response message transmitted in a predefined beacon frame.

6. The electronic device of claim 1, wherein the instructions, when executed by the at least one processor individually or collectively, further cause the electronic device to:
control the communication circuitry to connect to the external electronic device operating as the group owner through a second communication channel different from a first communication channel for the wireless communication through the direct communication group; and
control the communication circuitry to transmit the schedule change request message through the second communication channel.

7. The electronic device of claim 1, wherein the instructions, when executed by the at least one processor individually or collectively, further cause the electronic device to, based on identifying that the wireless communication is performed by being connected to an access point through periodic channel change based on time division, generate the schedule change request message by including information on the periodic channel change.

8. A method of an electronic device, the method comprising:
generating a direct communication group in which an external electronic device operates as a group owner and the electronic device operates as a group client through a Wi-Fi direct connection with the external electronic device, to perform wireless communication;
transmitting, to the external electronic device operating as the group owner, a schedule change request message requesting to change an operation schedule of the direct communication group, based on at least one component of the electronic device entering an inactive state from an active state, or entering the active state from the inactive state, according to a change in an operating state of an application executed by the electronic device which provides a service through the direct communication group;
receiving, from the external electronic device operating as the group owner, a response message including operation schedule information configured based on the schedule change request message; and
performing the wireless communication with the external electronic device operating as the group owner according to the operation schedule information of the response message received from the external electronic device.

9. The method of claim 8, wherein the schedule change request message comprises at least one of information describing a current operating state, information describing a change time, or information describing a change interval.

10. The method of claim 8,
wherein the schedule change request message is transmitted in a peer-to-peer (P2P) presence request frame, and
wherein the P2P presence request frame comprises at least one of an attribute field, a duration field, or an interval field.

11. The method of claim 10,
wherein the response message is received in a P2P presence response frame, and
wherein the P2P presence response frame comprises a status code indicating a result of the schedule change request message.

12. The method of claim 8, wherein the response message is received in a predefined beacon frame.

13. The method of claim 8, further comprising:
connecting to the external electronic device operating as the group owner through a second communication channel different from a first communication channel for the wireless communication through the direct communication group,
wherein the transmitting the schedule change request message comprises transmitting the schedule change request message through the second communication channel.

14. The method of claim 8, further comprising:
identifying that the wireless communication is performed by being connected to an access point through periodic channel change based on time division; and
generating the schedule change request message by including information on the periodic channel change.

15. An electronic device comprising:
communication circuitry;
at least one processor including processing circuitry; and
memory configured to store instructions which, when executed by the at least one processor individually or collectively, cause the electronic device to:
operate as a group owner of a Wi-Fi direct communication group;
receive, through the communication circuitry from an external electronic device operating as a group client of the Wi-Fi direct communication group and connected through a Wi-Fi direct connection, a schedule change request message requesting to change an operation schedule of the Wi-Fi direct communication group, the schedule change request message being transmitted based on at least one component of the external electronic device operating as the group client entering an inactive state from an active state, or entering the active state from the inactive state, according to a change in an operating state of an application executed by the external electronic device which provides a service through the Wi-Fi direct communication group;
configure operation schedule information based on the schedule change request message;
control the communication circuitry to transmit, to the external electronic device operating as the group owner, a response message including the operation schedule information; and
enter an owner inactive state for at least one period determined according to the operation schedule information, and
wherein the response message indicates a result of the schedule change request message.

* * * * *